United States Patent
Yegge et al.

(10) Patent No.: US 7,039,592 B1
(45) Date of Patent: May 2, 2006

(54) AGRICULTURAL BUSINESS SYSTEM AND METHODS

(75) Inventors: Pamela S. Yegge, 215 N. Main, Buffalo Center, IA (US) 50424; Danny M. Yegge, Buffalo Center, IA (US)

(73) Assignee: Pamela S. Yegge, Buffalo Center, IA (US)

( * ) Notice: Subject to any disclaimer, the term of this patent is extended or adjusted under 35 U.S.C. 154(b) by 330 days.

(21) Appl. No.: 09/819,497

(22) Filed: Mar. 28, 2001

(51) Int. Cl.
 *G06F 17/60* (2006.01)
(52) U.S. Cl. .............................. 705/4; 705/7; 705/10
(58) Field of Classification Search .................. 705/4, 705/10, 7
See application file for complete search history.

(56) References Cited

U.S. PATENT DOCUMENTS

| | | | |
|---|---|---|---|
| 5,191,522 A | 3/1993 | Bosco et al. | |
| 5,210,687 A | 5/1993 | Wolfberg et al. | |
| 5,884,286 A | 3/1999 | Daughtery, III | |
| 5,897,619 A | 4/1999 | Hargrove, Jr. et al. | |
| 5,907,828 A | 5/1999 | Meyer et al. | |
| 5,960,415 A | 9/1999 | Williams | |
| 6,049,772 A | 4/2000 | Payne et al. | |
| 6,058,369 A | 5/2000 | Rothstein | |
| 6,865,542 B1* | 3/2005 | Cox et al. | 705/10 |
| 2001/0027437 A1* | 10/2001 | Turbeville et al. | 705/38 |
| 2002/0023052 A1* | 2/2002 | Remley et al. | 705/38 |
| 2002/0059091 A1* | 5/2002 | Hay et al. | 705/8 |
| 2002/0103688 A1* | 8/2002 | Schneider | 705/8 |
| 2002/0183867 A1* | 12/2002 | Gupta et al. | 700/28 |

FOREIGN PATENT DOCUMENTS

KR        2001103372 A  *  11/2001

OTHER PUBLICATIONS

Information available at the web site of The Anderson Inc., Mar. 11, 2001, 3 pages.*
Information available at the web site of the Center for Farm Financial Management, University of Minnesota, Aug. 2000, 6 pages.*
Russnogle, John, "Pictures of Profit", Soybean Digest, Dec. 2000, 1 page.*
U.S. Appl. No. 60/226,857.*
Anonymous, "The Andersons, Inc. Licenses Software to American Agrisurance Farmers Gain Powerful New Marketing Tool", PR Newswire, No. 62876867, Oct. 24, 2000, 2 pages.*
Information available at the web site of Cargill, Pocock, John, "Cargill AgHorizons to offer The Andersons' Crop Revenue Profiler Software", Nov. 15, 2000, 2 pages.*

(Continued)

*Primary Examiner*—Joseph Thomas
*Assistant Examiner*—Lena Najarian
(74) *Attorney, Agent, or Firm*—Jeffrey D. Harty

(57) ABSTRACT

A new system for providing agricultural financial services is provided. The system includes crop insurance services, where a proper level of crop insurance is determined necessary to assure income approximately equal to the producer's break even point. In a management accounting or record keeping portion, estimated expenses and income are replaced with actual amounts on a periodic basis, providing a more accurate measure of expected profits and losses. In a marketing aspect, decisions regarding whether to sell agricultural products is based upon the expected profitability of the transaction and the producers profitability goal.

9 Claims, 9 Drawing Sheets

OTHER PUBLICATIONS

Stalcup, Larry, "Elevate your market advice", Soybean Digest, Feb. 2001, vol. 61, No. 2. pp. 58.*

Otte, John, "Capture weather premiums", Wallaces Farmer, May 2000, vol. 125, No. 8, pp. 22.*

Anonymous, "Vendor of the month: ECI farm equity manager software", Bank News, Oct. 1998, vol. 98, No. 10, pp. 16.*

DeVuyst, E. "Farm Managment Software and Risk: A Review," Dec. 31, 1995, Journal of the ASFMRA, p. 174-179.*

Bevers, S. "BudPro—Budget Projection Software," May 1999, Texas Agricultural Extension Service.*

"BudPro—Budget Projection Software: What is BudPro?" Risk Management Education, Nov. 1998.*

Bevers, S. "Department of Agricultural Economics: BudPro—Budget Projection Software," Nov. 1998.*

"BudPro—Budget Projection Software: Curriculum Guide," Risk Management Education, Nov. 1998.*

O'Brien, D. M. "Grain Marketing Plans for Farmers," Kansas State University Agricultural Experiment Station and Cooperative Extension Service, Jul. 2000.*

LaDue, E. L. "CASHPRO," Dec. 2000, Agricultural Finance and Management at Cornell.*

Miranda, M. "AgRisk 1.0 Technical Reference," Aug. 31, 2000.*

"Optimal Grain Marketing: Balancing Risks and Revenue," National Grain and Feed Foundation, 1999.*

* cited by examiner

☐ ACTUAL ☒ PROJECTED
NAME:
ADDRESS:
CITY, STATE, ZIP:
DATE COMPLETED
FOR THE YEAR:

MONTHLY INCOME & EXPENSE
CASH FLOW

PHONE # _____
CELL # _____ —86

CORN ACRES [633] X PROJECTED YIELD [145] ACRES RENTED ___ = 306 [91,785] CORN BUSHELS
% CORN VS. TOTAL ACRES [50.76%]—88                   ACRES OWNED  190
                                                     ACRES CROP SHARES  137 —56

—50

CORN —58

| CORN INCOME | JANUARY → | DECEMBER | TOTALS | PER ACRE |
|---|---|---|---|---|
| CASH INCOME | JANUARY → | DECEMBER | TOTALS | PER ACRE |
| GRAIN | | 183,570.00 | 183,570.00 | 290.00 |
| HEDGE INCOME | | | | |
| LDP | | 5,000.00 | 5,000.00 | 7.90 |
| PRODUCTION INCOME | | | | |
| EXPENSE REIMBURSEMENTS/REFUNDS | | | | |
| SEED SALES | | | | |
| TOTAL CORN OPERATING INCOME —62 | | 188,570.00 | 188,570.00 | 297.90 |
| SALE OF FIXED ASSETS (USED ON CORN ONLY) | | | | |
| MACHINERY AND EQUIPMENT | | | | |
| TOTAL SALE OF FIXED ASSETS —64 | | | | |
| TOTAL CORN SHARED INCOME —66 | 37,208.42 | | 37,208.42 | 58.78 |
| TOTAL CORN INCOME>>>>> —68 | 225,778.42 | | 225,778.42 | 356.68 |

| CORN OPERATING EXPENSES | JANUARY ⟶ DECEMBER | TOTALS | PER ACRE |
|---|---|---|---|
| CHEMICALS | 19,210.00 | 19,210.00 | 30.35 |
| CROP INSURANCE | 11,394.00 | 11,394.00 | 18.00 |
| CUSTOM/MACHINE HIRE | | | |
| EQUIPMENT RENTAL | | | |
| FERTILIZERS | 29,600.00 | 29,600.00 | 46.76 |
| FREIGHT AND TRUCKING | 4,400.00 | 4,400.00 | 6.95 |
| GRAIN STORAGE | | | |
| LAND PAYMENT (PRINCIPAL) OWNED ACRES | 22,200.00 | 22,200.00 | 116.84 |
| LAND PAYMENT (INTEREST) OWNED ACRES | 2,800.00 | 2,800.00 | 14.74 |
| PCP BUYBACK | | | |
| RENT | 40,720.00 | 40,720.00 | 133.07 |
| SEED | 20,300.00 | 20,300.00 | 32.07 |
| UTILITIES - GAS (LP) | 5,250.00 | 5,250.00 | 8.29 |
| TOTAL CORN FUEL EXPENSE | 7,950.00 | 7,950.00 | 12.56 |
| TOTAL CORN OPERATING EXPENSE | 155,874.00 | 155,874.00 | 246.25 |
| TOTAL CORN SHARED EXPENSES | 28,462.16 | 28,462.16 | 44.96 |
| GRAND TOTAL CORN EXPENSE | 192,286.16 | 192,286.16 | 303.77 |
| NET CORN INCOME/(LOSS) | | 33,492.26 | 52.91 |
| CORN CASH POSITION | | 33,492.26 | 52.91 |

Fig. 5B

| 92 | CORN | | | SOYBEANS | | | OTHER | | |
|---|---|---|---|---|---|---|---|---|---|
| | PER BUSHEL | PER ACRE | TOTAL | PER BUSHEL | PER ACRE | TOTAL | PER BUSHEL | PER ACRE | TOTAL |
| BREAKEVEN | 2.09 | 303.77 | 192,286.16 | 5.01 | 225.63 | 138,536.84 | | | |
| LOC NEEDED | (1.07) | (154.98) | (98,101.00) | (2.90) | (130.70) | (80,251.90) | | | |
| INCOME POTENTIAL | 2.46 | 356.68 | 225,778.42 | 6.77 | 304.75 | 187,116.58 | | | |
| MIN. CRC $ REQ'D. | 2.09 | 303.77 | 192,286.16 | 5.01 | 225.63 | 138,536.84 | | | |

94

| | CORN | SOYBEAN | OTHER |
|---|---|---|---|
| 1 | 150 | 45 | |
| 2 | 65% | 75% | |
| 3 | 2.60 | 5.00 | |
| 4 | 0 | 0 | |

96

PLUG & PLAY SECTION:

1  AVERAGE ACTUAL PRODUCTION HISTORY (APH) ON ALL FARMS
2  % LEVEL OF COVERAGE FOR CRC INSURANCE
3  PRICE ELECTION FOR CRC INSURANCE
4  PRICE ADD ON FOR CRC INSURANCE (IF PURCHASED)

| CRC INSURANCE | CORN | SOYBEANS | OTHER | OTHER |
|---|---|---|---|---|
| ACRES | 633 | 614 | 0 | |
| APH | 150 | 45 | 0 | |
| LEVEL OF INSURANCE | 65% | 75% | 0 | |
| ELECTION PRICE | 2.60 | 5.00 | 0 | |
| PRICE ADD ON | 0 | 0 | 0 | |
| PER ACRE ASSURED INCOME | 253.50 | 168.75 | 0 | |
| TOTAL ASSURED INCOME | 160,465.50 | 103,612.50 | 0 | |
| GOVERNMENT PAYMENTS | 37,208.42 | 36,091.58 | 0 | |
| OVER OR (UNDER) INSURED? | 5,387.76 | 1,167.24 | 0 | |

Fig. 6B

| SALES CONTRACTED | | 1 | CONTRACT DATE | 3-2-01 | ELEVATOR | | | |
|---|---|---|---|---|---|---|---|---|
| | CORN | | | SOYBEANS | | OTHER | | |
| CHICAGO BOARD OF TRADE PRICE | $2.55 | MARCH 1 | | $5.12 | LOAN RATE | | | |
| LOCAL BASIS | .40 | | | | | | | |
| PUT: COST | .00 | | | | | | | |
| PUT: | MONTH | STRIKE PRICE | MONTH | STRIKE PRICE | MONTH | STRIKE PRICE | MONTH | STRIKE PRICE |
| DETAILS | | | | | | | | |
| CALL: COST | .00 | | | | | | | |
| CALL: | MONTH | STRIKE PRICE | MONTH | STRIKE PRICE | MONTH | STRIKE PRICE | MONTH | STRIKE PRICE |
| DETAILS | | | | | | | | |
| OTHER HEDGE TYPE: COST | .00 | | | | | | | |
| HEDGE: | MONTH | STRIKE PRICE | MONTH | STRIKE PRICE | MONTH | STRIKE PRICE | MONTH | STRIKE PRICE |
| DETAILS | | | | | | | | |
| LDP | .05 | | | 0.00 | | | | |
| PUT/CALL/HEDGE INCOME | 0.00 | | | .11 | | | | |
| GOVERNMENT PAYMENTS | .41 | | | 1.31 | | | | |
| OTHER INCOME | 0.00 | | | 0.00 | | | | |
| NET SALES PRICE | 2.61 | | | 6.56 | | | | |
| BREAKEVEN PER BUSHEL | 2.09 | | | 5.01 | | | | |
| PROFIT/(LOSS) PER BUSHEL | .51 | | | 1.54 | | | | |

*Fig. 7A*

| | | |
|---|---|---|
| PRODUCTION BUSHELS | 91,785 | 27,630 |
| BUSHELS SOLD TODAY | 10,000 | 5,000 |
| BUSHELS SOLD TO DATE | 10,000 | 5,000 |
| % BUSHELS SOLD TO DATE | 10.90% | 18.10% |
| OPEN BUSHELS TO DATE | 81,785 | 22,630 |
| % BUSHELS TO DATE | 89.10% | 81.90% |
| ACRES SOLD TODAY | 69.0 | 111.1 |
| ACRES SOLD TO DATE | 69.0 | 111.1 |
| INCOME/(LOSS) ON BUSHELS SOLD TODAY | $5,104.24 | $7,705.45 |
| GROSS PROFIT/(LOSS) ON BUSHELS SOLD TO DATE | $5,104.25 | $7,705.45 |
| GROSS PROFIT/(LOSS) PER ACRE ON BUSHELS SOLD TO DATE | $74.01 | $69.35 |

Fig. 7B

AGRICULTURAL BUSINESS SYSTEM AND METHODS

BACKGROUND OF THE INVENTION

1. Field of the Invention

The present invention relates generally to financial systems and services. More particularly, though not exclusively, the present invention relates to a system and methods for providing financial services to producers in the agricultural industry.

2. Problems in the Art

Providing financial management services to producers in the agricultural industry is not new. Crop and livestock producers have for years sought better ways to help maximize profitability. Uncertainty about the future is an inherent part of farming and often times affects profitability. Producers have therefore looked to business models and financial planning to help maintain a profitable operation. Unfortunately, the business models and the system presently available suffer from various deficiencies.

The purchase of crop insurance is often problematic for producers. Typically, a producer will purchase a level of crop insurance that leaves him either overinsured or underinsured. If a producer is underinsured, he is at a risk of not covering his expenses in the event of a poor yield or harvest. Whereas if the producer is overinsured, he is paying for insurance that he does not need, which negatively affects profitability. To date, producers have only been guided by past experience and rules of thumb in determining how much crop insurance to purchase at the beginning of each year. Thus, a need in the art exists for a new system and methods to help ensure that the crop producer has a guaranteed income as close to the break even point as possible.

Another problem in the art concerns the ability to accurately predict profits and losses for the producer. Many producers rely solely upon estimated future income and expenses as a measure of expected profitability. However, such a predictive model fails to count for actual expenses that are incurred and income that is realized during the year. For instance, a producer might estimate total future expenses at the beginning of each year to establish an annual break even point. If during the year actual expenses exceed the estimates, the break even point may tend higher unbeknownst to the producer. Without the benefit of this information, the producer is at greater risk of making poor business decisions based upon faulty assumptions regarding profitability. A need therefore also exists in the art for a financial consulting and management system that takes into account actual expenses and income in predicting future profitability.

Other problems in the art concern the use of sales contracts and, in particular, decisions regarding when to enter into contracts for the sale crops or livestock. Producers will often rely upon marketers for advice as to when to sell. In evaluating when to exercise a "put" or "call" or any type of hedge account, the marketer will not likely know the impact on profitability that such a transaction would have until it is complete. What is more, the marketers or producer tend to make assumptions on profitability based upon inaccurate forecasts of profits and losses that fail to account for the producer's current break even point. As a result, a producer will likely either sell too low to achieve his profitability goal or fail to capitalize upon a lucrative buying opportunity. A need therefore also exists for an improved marketing system and methods tied to the producer's current break even point that facilitates informed decision making.

To date, various business organizations have sought to provide crop insurance services for producers. Others have offered accounting and record keeping services. And still others have provided brokerage or marketing services for producers. Many of the aforementioned problems arise from the inability to link or integrate these services. As an example, knowing the producers' break even point may be useful in determining an appropriate level of crop insurance. That same break even point and related financial information is of value to marketers in advising producers on contemplated sales contracts. As previously explained, the break even point is likely to fluctuate throughout the growing season or year with unforeseen expenses. This is but one example of how these three financial services provided to producers—crop insurance services, accounting and record keeping services, and marketing services—are inter-related and rely upon much of the same financial information. Such an integrated system of financial services is not presently available, however. The need therefore exists for a new method of doing business wherein such services are integrated and provided by either a single source or affiliated firms.

FEATURES OF THE INVENTION

A general feature of the present invention is the provision of improved financial services, systems and methods which overcome the problems and deficiencies found in the prior art.

A further feature of the present invention is the provision of a new system and methods for providing crop insurance services to determine an appropriate level of insurance for a producer.

A further feature of the present invention is the provision of a new agricultural management system and methods that tracks actual expenses and income throughout the accounting period and provides an accurate forecast of future profitability based upon both actual and projected future amounts.

A still further feature of the present invention is the provision of an improved marketing system and methods that provides the producer and marketer with accurate profitability information to make informed decisions regarding the sale of crops and livestock.

Another feature of the present invention is the provision of a method of doing business that integrates crop insurance services, accounting or record keeping services and marketing services.

These as well as other features and advantages of the present invention will become apparent from the following specification and claims.

SUMMARY OF THE INVENTION

One aspect of the present invention includes a new method for determining a level of crop insurance for a producer to help avoid situations where the producer is either overinsured or underinsured. The method generally includes determining a producer's break even point based upon estimated future expenses. Once the breakeven point is known, a level of crop insurance can be purchased that will assure income substantially equal to that breakeven point.

Another aspect of the present invention includes new methods for managing the finances of an agricultural producer to help maximize profitability. One method generally includes collecting information from the producer concerning estimated future income and expenses for a predefined period, tracking actual income and expenses on a periodic basis, updating the estimated future income and expenses with the actual amounts, computing a profitability for the producer that reflects both actual and estimated amounts, monitoring disparities between the estimated feature amounts and actuals, and then advising the producer regarding profitability on an ongoing basis during the predefined period.

A related method includes the use of a software article for tracking income, expenses, and profitability. The software article, such as a computer spreadsheet, is a useful tool in updating the estimated amounts with actuals, calculating current estimates of profitability, and generating reports for the producer.

Another aspect of the present invention includes a system and methods for determining whether to enter into a contemplated sales contract for agricultural products, such as crops or livestock. The method generally includes determining a profitability goal for the producer, tracking actual income and expenses for the producer on a periodic basis, calculating a present breakeven point based upon actual expenses and estimated future expenses, and calculating the profitability of the contemplated sales contract based upon the present breakeven point. In comparing the profitability of the sales contract with the profitability goal for the producer, the marketer and/or producer can make an informed decision regarding whether to sell.

A still further aspect of the present invention includes the integration of financial management services for crop producers wherein crop insurance services, financial management services, and marketing services share information to make informed business decisions in order to maximize profitability for the producer. In its preferred form, the crop insurance services include an evaluation of the proper level of crop insurance where the producer is neither overinsured nor underinsured, the financial management services provide an ongoing analysis of breakeven points and profitability, and the marketing services provide an evaluation as to the profitability of contemplated sales contracts based upon current financial information available from the financial management services.

BRIEF DESCRIPTION OF THE DRAWINGS

The present invention is illustrated by way of example and not limitation in the figures of the accompanying drawings, in which like references indicate similar elements and in which:

FIGS. 5 and 6 are representative screen displays from a computerized spreadsheet used in the accounting and record keeping portions of the invention.

FIG. 7 is a representative screen display from a computerized spreadsheet concerning the marketing aspect of the present invention.

DETAILED DESCRIPTION OF A PREFERRED EMBODIMENT

The present invention will be described as it applies to a preferred embodiment. It is not intended that the present invention be limited to the described embodiment. It is intended that the invention cover all modifications and alternatives which may be included within the spirit and scope of the invention.

Figure 1:
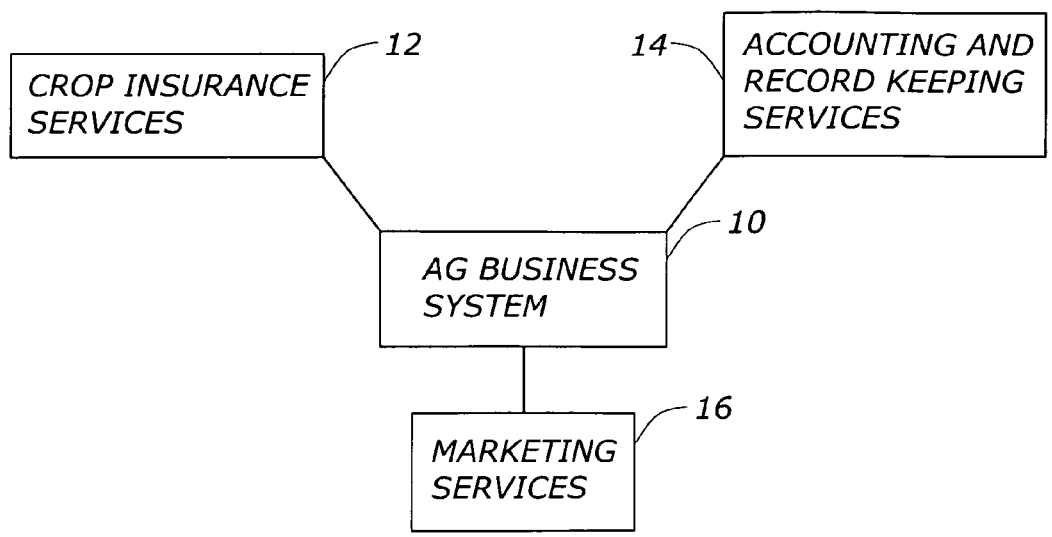
FIG. 1 is a diagram illustrating the preferred financial services system of the present invention.

The preferred embodiment is directed to an agricultural business system and methods that integrates crop insurance services, accounting and record keeping services, and marketing services for agricultural producers. The integration of these services in an ag business system 10 is illustrated by the diagram in FIG. 1. Crop insurance services 12, accounting and record keeping services 14, and marketing services 16 have previously been considered separate financial management activities, one service operating independently of the others. Unfortunately, such an approach generally fails to take into account the producer's entire business operation. Failure to integrate these services and share relevant financial information leads to uninformed business decisions that negatively impact the profitability of the producer. For example, the present invention ties the level of crop insurance for a producer to his break even point. This same break even point may change throughout the growing year and can be tracked using the accounting and record keeping services of the present invention. In addition, the present invention ties the current break even point to the marketing services, providing the marketer with accurate information to project the profitability of a proposed sales contract. This is but one example of how the present invention contemplates that the crop insurance services 12, accounting and record keeping services 14, and marketing services 16 are inter-related and should be integrated into an ag business system 10. It should be understood, however, that the present invention is not limited to the combination of such services, but also includes new and non-obvious subject matter within each of the different service areas.

Figure 2:
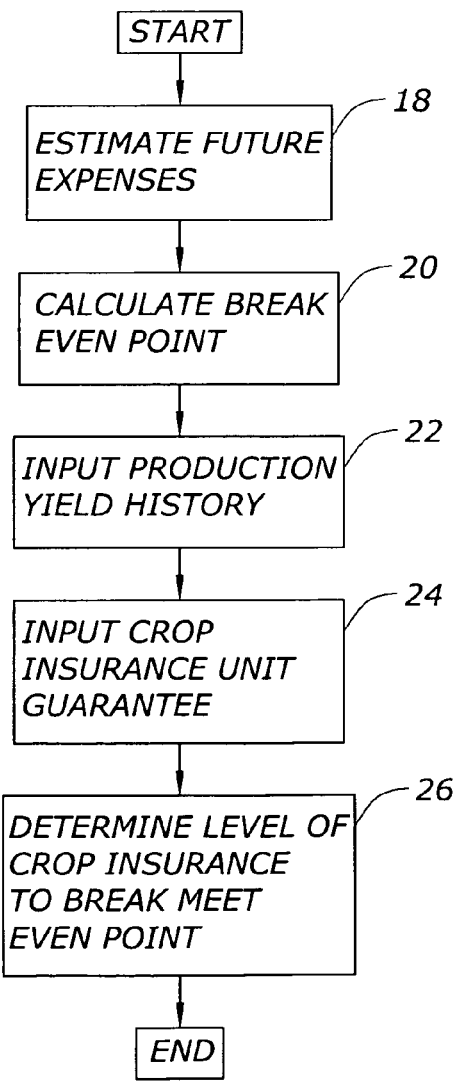
FIG. 2 is a flow chart illustrating the preferred method of the present invention for providing crop insurance services.

Regarding a description of the crop insurance services aspect of the present invention, reference is now made to the flow chart in FIG. 2. The method of the present invention for determining the appropriate level of crop insurance for the producer helps to reduce the risk that the producer will be either overinsured or underinsured. Future expenses for the producer are estimated for a predefined period. It is preferred that the predefined period is a calendar year or growing season. For purposes of this disclosure, the predefined period will begin January 1 and end December 31. The method starts at step 18 with the producer estimating future income and expenses for the year. A break even point can then be calculated at step 20 as the total of all estimated future expenses for the year. The break even point provides the producer with an indication of how much income will be required to at least cover the producer's expenses. Next, the producer's production yield history and the crop insurance unit guarantee are inputted at steps 22 and 24, respectively. Once the break even point, production yield history and crop insurance unit guarantee are known, one can determine the level of crop insurance necessary to assure income to meet the producer's break even point at step 26. It is preferred that the production yield history be the Actual Production History (APH), which is normally reported on a bushel per acre unit basis. The crop insurance unit guarantee is normally a dollar amount per bushel. Accordingly, an appropriate level of crop insurance can be determined from the following:

$$APH \times \text{Crop Insurance Level}(\%) \times \text{Unit Guarantee} = \text{Break Even Point}$$

From this relationship an appropriate level of crop insurance can be determined. It should be understood that in most cases it will be difficult to purchase an amount of crop insurance that assures income precisely equal to the producer's break even point, particularly since the producer's projected break even point is likely to fluctuate during the year. It is intended that the producer purchase a level of crop insurance to assure enough income to approximate as close as possible the producer's break even point.

Figure 3:
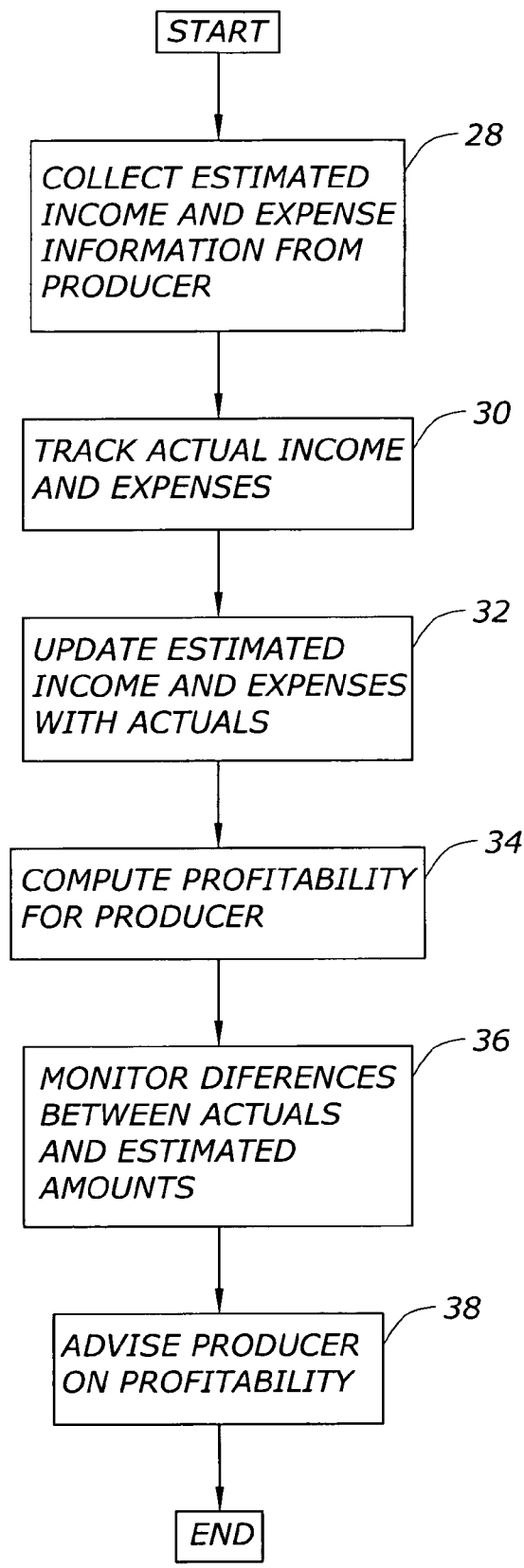
FIG. 3 is a flow chart illustrating the preferred method employed in the accounting or record keeping aspect of the present invention.

Referring now to the accounting and record keeping services aspect of the present invention, the preferred method is illustrated in the flow chart shown in FIG. 3. Merely projecting future expenses and income at the beginning of the year is generally inadequate to assist the producer in maximizing his profitability goal. Actual expenses that are incurred and income realized during the year should be accounted for to provide a more accurate picture of profitability, which would likely influence future decision making. The preferred method begins at step 28 where the estimated future income and expenses for the year are collected from the producer. Actual and income and expenses are then tracked for the producer on a periodic basis at step 30. For example, bank records that reflect income streams and expenses is one source for tracking inflows and outflows from the producer's business operation. The estimated income and expenses should be updated with actual amounts at step 32. This should again be done on a periodic basis, such as monthly. The projected profitability for the producer can then be computed at step 34 based upon the actual income and expenses as well as the future income and expenses. Note that this is a significant improvement upon the prior art wherein profitability models rely upon initial estimates, failing to reflect actual income realized and expenses incurred throughout the year. In recording both the actual and projected amounts, a financial adviser and/or the producer can monitor the disparities between the budgeted and actual amounts (step 36). These differences can often impact upon future decisions to buy and sell. For example, the producer who has exceeded his expected expense levels during the first part of the year will take that into account in deciding whether to purchase additional equipment and supplies during the remainder of the year. Based upon the accounting and record keeping activities described above, the financial adviser can advise the producer regarding profitability on an ongoing basis during the year (step 38).

It is preferred that one or more software applications be used in tracking the income, expenses and profitability for the producer. Implementing the preferred method as part of a computerized process greatly simplifies and makes steps 32 and 34. It is also useful in monitoring any disparities that may exist between the budgeted and actual amounts (step 36). Such a software application can be customized to generate a report regarding the producer's financial history, projected future earnings and expenses, and expected profitability for the year. Although such a software application could take many forms, it is preferred that a computer spreadsheet (such as Microsoft Excel) be utilized for this purpose.

Figure 4:
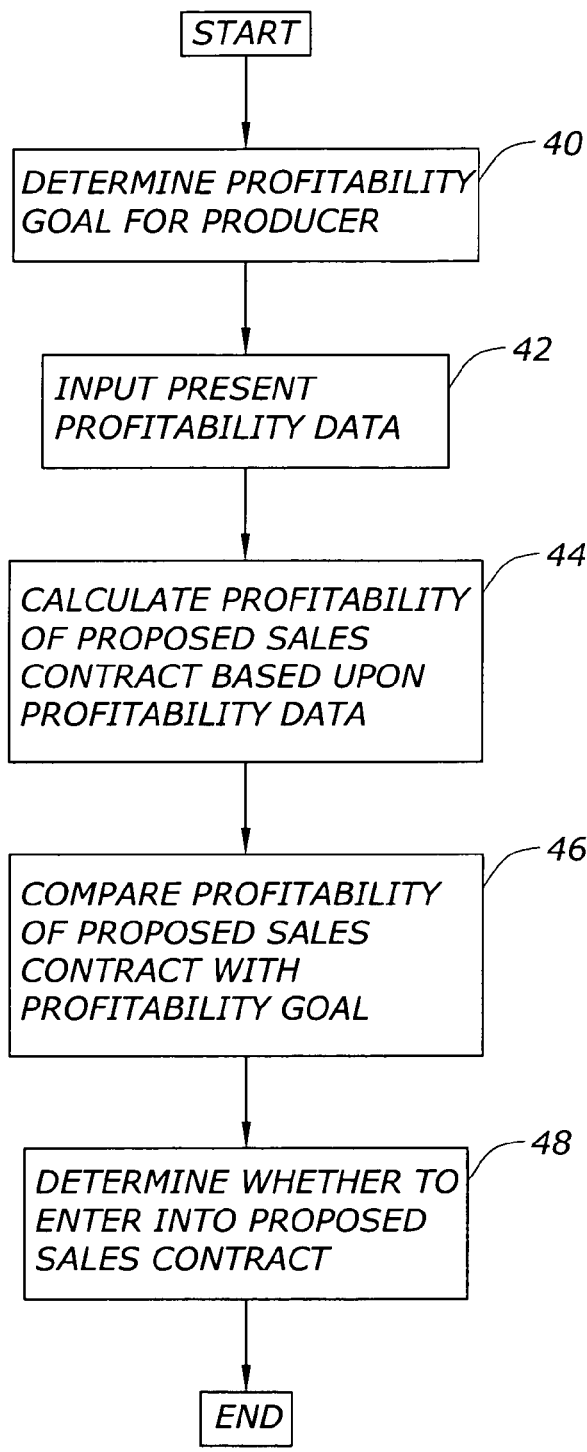
FIG. 4 is a flow chart illustrating the preferred method regarding the marketing services aspect of the present invention.

Referring now generally to the marketing services aspect of the present invention, attention is drawn to the flow chart in FIG. 4. The marketing services portion relies upon the estimated future income and expenses and updated actual amounts to project the profitability for the producer during the year. With this information known, the producer and/or financial adviser can determine a profitability goal for the producer at step 40. Current profitability data is then inputted at step 42.

Producers use sales contracts for selling agricultural products, such as crops and livestock. Producers will often reply upon marketers for advise as to when to sell. In the past, however, in evaluating when to exercise a "put" or "call" or any type of hedge account, the marketer has not had the benefit of knowing the impact the sales transaction would have on the producer's profitability until after the transaction was complete. Because the present profitability data is made available to the marketer at step 42, a more accurate determination of expected profitability resulting from the proposed sales contract can be made. Shown in the flow chart in FIG. 4 at step 44, the profitability of the proposed sales contract is calculated based upon the present profitability data. The marketer and/or producer can then compare profitability of the proposed sales contract with the producer's profitability goal at step 46. If, for example, the producer has a profitability goal of $50 per acre, this can be compared to the profitability of the proposed sales contract on a dollar per acre basis to determine whether or not to enter into the sales contract (see step 48). Simply put, in comparing the profitability of the proposed sales contract with the profitability goal for the producer, the marketer and/or producer can make an informed decision regarding whether to sell.

As discussed previously, it is preferred that the ag business system 10 of the present invention be implemented, at least in part, by means of a computer software application. To provide the financial services to less than approximately 100 farmers, it is preferred that a computer spreadsheet be customized for this purpose. In particular, a multi-sheet 3-dimensional spreadsheet, such as Microsoft Excel, has been found suitable for use with the present invention. FIGS. 5–7 are screen displays of representative sheets from the spreadsheet used as part of the preferred embodiment.

FIGS. 5A and 5B illustrate a sheet 50 for tracking incoming expenses for a crop. Although sheet 50 is customized for a corn crop, it should be understood that the invention is not limited to a particular crop. Further, the same methods apply to livestock and other agricultural products.

The sheet 50 includes a plurality of cells in rows and columns for entering financial information and performing useful calculations. Sheet 50 contemplates that expenses and income will be tracked on a monthly basis over a calendar year. Thus, columns 52 denote entries for different months. Column 54 is for totals and column 56 provides information on a dollar per acre unit basis. Corn income is denoted by the text label in cell 58. Corn income 58 includes cash income 60 from various sources such as grain, hedge income, LDP, production income, expense reimbursement/refunds and seed sales. Totals are tabulated in row 62 as total corn operating income. The sale of fixed assets (used on corn only) is denoted in cell 64, the total sale of fixed assets is tabulated in row 66, the total corn shared income shown in row 68, and the total corn income is tabulated in row 70. Note that the shared income represents indirect income that is allocated across various crops and livestock of the producer. The shared income may be allocated, for example, on a per acre basis with other crops. Additional sheets (not shown) can be provided for collecting and tracking shared income.

The corn operating expenses are denoted by the text in cell 72. By way of example only, such expenses could include chemicals, crop insurance, custom/machine hire, equipment rental, fertilizers, freight and trucking, grain storage, land payment (principal), land payment (interest), PCP buy back, rent, seed, and utilities. The total corn fuel expense is shown in row 74 and the total corn operating expense is tabulated in row 76 as the total of the operating expenses and fuel expense. The total corn shared expenses are shown in row 78. And, again, additional sheets (not shown) can be provided for collecting and tracking such shared expenses. The shared expenses are allocated similarly to the shared income described above. The grand total corn expense is computed and displayed in rows 80 with the net corn income/loss and corn cash position shown in rows 82 and 84, respectively.

It is intended that the estimated future expenses and income collected from the producer are entered into the applicable cells. These budgeted amounts are then updated with actual amounts on a monthly basis. It can be appreciated by those skilled in the art that following such a process provides a more accurate projection of the producer's profitability. In addition, large discrepancies between budgeted and actual amounts can be easily flagged and brought to the producer's attention. Still further, at the end of the period, the actual amounts can be put into a report for income tax preparation and reporting purposes.

Note that cell 86 is provided to enter the total number of corn acres. The percentage of corn acres is calculated in cell 88, taking into account additional sheets on other crops. In addition, multiplying the number of corn acres times the projected yield provides a forecasted number of bushels.

It can be appreciated by those skilled in the art that the financial information contained on sheet 50 is not only relevant to the accounting and record keeping services 14 but also impacts upon the crop insurance services 12 and marketing services 16. The ag business system 10 is related closely to the producer's break even point and projected profitability, such that any change in income and expenses will be reflected.

Much of the functionality relating to the crop insurance services aspect of the present invention is illustrated by sheet 90, which is shown in FIGS. 6A and 6B. Table 92 contains a tabulated break even point, line of credit needed, income potential, and minimum CRC dollars of insurance required. The plug and play section shown in table 94 allows the producer or adviser to play out various scenarios using the matrix 96. Based upon the actual production history, level of coverage for CRC insurance, price election for CRC insurance and price add-on for CRC insurance (if purchased), one can quickly determine whether the producer is either underinsured or overinsured from table 98. The total assured income in table 98 is compared with the break even point in table 92 to determine whether the level of coverage selected provides an adequate amount of insurance. As explained previously, it is preferred that the producer purchase a level of crop insurance such that the assured income is substantially equal to total expenses for the year, i.e. the producer's break even point.

FIGS. 7A and 7B show a sheet 100 that is used in the marketing services portion of the present invention. One sheet is used per sales contract. The Chicago Board of Trade Price and Local Basis is input into rows 102 and 104, respectively. Information related to the cost of a put and the cost of a call is found in sections 106 and 108, respectively, of the sheet 100. In addition, costs relating to other hedge types is found in section 110. The put/call/hedge income, government payments, other income, net sales price, break even per bushel, and profit/(loss per bushel) are tabulated and shown in section 112 of the sheet 100. Information regarding the number of production bushels, number of bushels sold, and number of bushels open is reported and/or tabulated in section 114. Important is that the marketer and/or farmer can be apprised of the income or loss on the bushels sold for a contemplated sales contract, as well as the gross profit/(loss) for the contemplated sales transaction. It can be appreciated that the break even point and profitability data incorporated into sheet 100 relate back to the accounting and record keeping sheets discussed previously. As a result the expected income or loss from a proposed sales contract can be determined and evaluated in considering whether to enter into the contract.

Those skilled in the art will appreciate that the computer spread sheets described above as part of the preferred embodiment can be manipulated and customized in a variety of different manners for a particular producer or ag business operation.

In the proceeding detailed description, the invention is described and referenced to a specific exemplary embodiment thereof. Various modifications and changes may be made thereto without departing from a broader spirit and scope of the invention as set forth in the claims. The specification and drawings are, accordingly, to be regarded in an illustrative rather than a restrictive sense. The invention is to be limited only by the claims appended hereto.

What is claimed is:

1. A new computer-implemented method for providing integrated financial management services to a crop producer comprising:
   recording projected income and expense data for the crop producer for a pre-defined period;
   determining an initial break even point for the crop producer wherein the break even point is the dollars necessary to cover the total of the projected expenses of the crop producer for the pre-defined period;
   updating at least a portion of the projected income and expense data with actual income and expense data for the crop producer and updating the break even point with the actual expense data;
   evaluating a desired level of crop insurance where the producer is neither overinsured nor underinsured, the desired level of crop insurance is a percentage defined by the break even point, a production yield history and a unit guarantee as follows (break even point)/(production yield history×unit guarantee)×100;
   computing projected profitability for the crop producer for the pre-defined period based upon current projected and actual expense data and any marketing of crop by the crop producer;
   computing the profitability of a potential sales contract defined by a sales price of the contract, a projected crop yield, a guaranteed income and the current actual and projected expenses for the producer for the pre-defined period as follows sales price×projected crop yield+ guaranteed income−actual and projected expenses; and
   generating a computer output showing results, including the profitability for the crop producer for the pre-defined period.

2. The computer-implemented method of providing integrated financial management services of claim 1 wherein the potential sales contract is a hedge.

3. The computer-implemented method of providing integrated financial management services of claim 1 wherein the production yield history is in bushels per acre, the unit guarantee is in dollars per bushel and the break even point is in dollars per acre.

4. The computer-implemented method of providing integrated financial management services of claim 1 wherein for computing the profitability of a potential sales contract the sales price is in dollars per bushel, the projected crop yield is in bushels per acre, the guaranteed income is in dollars per acre and the actual and projected expenses are in dollars per acre.

5. The computer-implemented method of providing integrated financial management services of claim 1 further includes updating the initial break even point for the pre-defined period based upon the projected and actual expense data.

6. The computer-implemented method of providing integrated financial management services of claim 1 further comprising the step of updating the initial break even point based upon the current actual and projected expense data.

7. A new computer-assisted method for providing integrated financial management services to a crop producer comprising:
- recording projected income and expense data for the crop producer for a pre-defined period;
- determining an initial break even point for the crop producer wherein the break even point is the dollars necessary to cover the total of the projected expenses of the crop producer for the pre-defined period;
- updating at least a portion of the projected income and expense data with actual income and expense data for the crop producer and updating the break even point with the actual expense data;
- evaluating a desired level of crop insurance where the producer is neither overinsured nor underinsured, the desired level of crop insurance is a percentage defined by the break even point, a production yield history and a unit guarantee as follows (break even point)/(production yield history×unit guarantee)×100;
- computing projected profitability for the crop producer for the pre-defined period based upon current projected and actual expense data and any marketing of crop by the crop producer;
- determining a profitability goal for the crop producer for the pre-defined period based upon the projected profitability;
- computing the profitability of a potential sales contract defined by a sales price of the contract, a projected crop yield, a guaranteed income and the current actual and projected expenses for the producer for the pre-defined period as follows sales price×projected crop yield+ guaranteed income−actual and projected expenses;
- evaluating whether to enter into the potential sales contract by comparing the profitability of the potential sales contract with the profitability goal for the crop producer; and
- generating a computer output showing results, including the profitability for the crop producer for the pre-defined period.

8. The method of claim 7 further comprising the step of advising the crop producer as to ways to improve profitability based upon the actual and projected income and expense data.

9. The method of claim 7 further comprising the step of providing financial consulting services to the crop producer based upon the actual and projected income and expense data.

* * * * *